(12) United States Patent
Müller et al.

(10) Patent No.: US 8,763,724 B2
(45) Date of Patent: Jul. 1, 2014

(54) EMULSION-BASED CLEANING COMPOSITION FOR OILFIELD APPLICATIONS

(75) Inventors: Heinz Müller, Monheim (DE); Diana Mäker, Monheim (DE)

(73) Assignee: Emery Oleochemicals GmbH (DE)

( * ) Notice: Subject to any disclaimer, the term of this patent is extended or adjusted under 35 U.S.C. 154(b) by 277 days.

(21) Appl. No.: 13/259,944

(22) PCT Filed: Mar. 22, 2010

(86) PCT No.: PCT/EP2010/001775
§ 371 (c)(1),
(2), (4) Date: Nov. 22, 2011

(87) PCT Pub. No.: WO2010/108640
PCT Pub. Date: Sep. 30, 2010

(65) Prior Publication Data
US 2012/0080232 A1  Apr. 5, 2012

(30) Foreign Application Priority Data
Mar. 24, 2009  (DE) .......................... 10 2009 014 119

(51) Int. Cl.
| | | |
|---|---|---|
| *E21B 21/06* | (2006.01) | |
| *E21B 43/16* | (2006.01) | |
| *C09K 8/34* | (2006.01) | |
| *C09K 8/36* | (2006.01) | |
| *C09K 8/52* | (2006.01) | |
| *E21B 37/06* | (2006.01) | |
| *C09K 8/035* | (2006.01) | |
| *C09K 8/28* | (2006.01) | |

(52) U.S. Cl.
CPC ............... *E21B 21/068* (2013.01); *E21B 37/06* (2013.01); *E21B 43/16* (2013.01); *C09K 8/36* (2013.01); *C09K 8/035* (2013.01); *C09K 8/34* (2013.01); *C09K 8/28* (2013.01)
USPC ............ 175/64; 175/66; 166/270.1; 166/375; 166/300; 166/304; 166/312; 507/103; 507/138

(58) Field of Classification Search
CPC ............ C09K 8/36; C09K 8/035; C09K 8/34; C09K 8/28; E21B 21/068; E21B 37/06; E21B 43/16
See application file for complete search history.

(56) References Cited

U.S. PATENT DOCUMENTS

| | | | |
|---|---|---|---|
| 2004/0082483 A1* | 4/2004 | Muller et al. | 507/100 |
| 2005/0032652 A1* | 2/2005 | Kirsner et al. | 507/100 |
| 2005/0067194 A1* | 3/2005 | Pena et al. | 175/66 |

OTHER PUBLICATIONS

International Preliminary Report of Patentability and Written Report and Written Opinion in corresponding application No. PCT/EP2010/001775, dated Sep. 27, 2011, 11 pages.

* cited by examiner

*Primary Examiner* — Zakiya W Bates
(74) *Attorney, Agent, or Firm* — Wood, Herron & Evans, LLP

(57) ABSTRACT

The present invention relates to an emulsion, consisting of an oil phase and an aqueous phase and comprising as emulsion components ($\alpha1$) 15 to 40% by weight of at least one water-immiscible organic solvent as solvent of the oil phase, ($\alpha2$) 15 to 40% by weight of water as solvent of the aqueous phase, ($\alpha3$) 10 to 40% by weight of at least one surfactant, ($\alpha4$) 10 to 40% by weight of an alkoxylated fatty alcohol and ($\alpha5$) 0 to 25% by weight of at least one other additive, wherein the quantities by weight of the components ($\alpha1$) to ($\alpha5$) are each relative to the total weight of the emulsion, and together add up to 100% by weight. The invention further relates to a method for producing an emulsion, to the emulsion which can be obtained from said method, to the use of an emulsion, to a method for cleaning the surfaces of well holes, drilling devices or drillings, to a method for producing a well bore, and to a method for producing an oil or a gas.

21 Claims, No Drawings

EMULSION-BASED CLEANING COMPOSITION FOR OILFIELD APPLICATIONS

This Application is a U.S. National Phase of PCT/EP2010/001775 entitled "Emulsion-Based Cleaning Composition For Oilfield Application" filed Mar. 22, 2010, which claims the benefit of DE Application Ser. No. 10 2009 014 119.7 entitled "Emulsion-Based Cleaning Composition For Oilfield Applications" filed Mar. 24, 2009, the disclosures of which are hereby incorporated by reference herein.

The invention under consideration concerns an emulsion, a method for the production of an emulsion, the emulsion obtained with this method, the use of an emulsion, a method to clean the surfaces of drillholes, drilling devices or cuttings, a method for the production of a drillhole, and a method for the production of oil or gas.

In drilling for and extracting crude oil and natural gas deposits, cleaning steps have to be inserted at many sites, so as to guarantee a nonproblematic course of the drilling and extracting process. Thus, the drillhole must be prepared for the production of oil or gas (completion) after the actual boring. To this end, an external pipe, the so-called "casing" or feeding pipe is introduced and cemented-in to stabilize the drillhole. The cement is conducted through the pipe in an aqueous, liquid form, is discharged at the lower end of the casing, and solidifies between the drillhole wall and the outer pipe. In order to ensure an optimal cementing process, it is necessary to free the drillhole wall and the casing from adhering remains of the drilling fluid and fine-particle, adhering solids. Otherwise, there is the danger that cavities or channels will be formed in the concrete layer, which reduce the stability of the concrete. Furthermore, residues of the drilling fluid with the cement can form a gelatinous mass, which prevents the setting of the cement, which also leads to a reduced stability of the cement jacket.

After the casing has been introduced into the drillhole, the actual delivery pipe, which has a smaller diameter than the casing, is installed. Between the outer wall of the delivery pipe and the inner wall of the casing, a sealing liquid is also introduced. Before the introduction of the sealing liquid, the so-called "packer fluid," the annular space between the casing and the delivery pipe is cleaned; in particular, all fine-particle solids that still adhere to the casing or the delivery pipe wall are removed, so as to ensure the performance of the sealing liquid.

The selection of the cleaning agent, suitable for the tasks described above, is also dependent on the type of drilling fluid used. In principle, it is possible to distinguish between water- and oil-based fluids. Nowadays, oil-based fluids are frequently used, either as so-called "true-oil-muds"—that is, fluids that do not contain dispersed water or contain it in only minor quantities—or so-called "invert muds," that contain between 5 and 45 wt % water as a dispersed phase, that is, form a W/0 emulsion. Furthermore, water-based O/W emulsions that contain a heterogeneous, finely disperse oil phase in a closed aqueous phase are known. As an oil phase, petroleum products, such as mineral or diesel oils, are usually used. As a result of the increasingly more stringent ecological requirements, however, synthetic oil phases, which, for example, contain esters of certain fatty acids, have been developed in recent times. Drilling fluids based on such ester oils are described, by way of example, in the publications EP-A-0 386 636, EP-A-0 374 671, and EP-A-0 374 672, and with regard to their biodegradability and toxicity, exhibit clearly improved characteristics, in comparison with petroleum products. With some drilling fluids based on synthetic esters, it is possible to observe the formation of tacky residues on metal surfaces or the drillhole wall, which can also lead to disturbing depositions.

The cleaning agents, like the cement during the cementing process, are pumped, in liquid form, downwards through the drill pipe, are discharged at the bottom of the drillhole, and are flushed upwards in the annular space between the pipe and the drillhole wall. They thereby dissolve remains of the drilling fluid and the solid particles adhering on the surfaces and transport them out of the drillhole. Such a method is described in detail, for example, in WO-A-94/29570. The agents are usually used in the form of aqueous or nonaqueous solutions or dispersions. They can, however, also be added directly to the drilling fluid, in concentrated, solid, or liquid form. Cleaning agents for the tasks described above can, for example, be mixtures of citric acid, pyrophosphate, and potassium salts, which are used in solid or dissolved form. These agents are suitable both for true-oil and also for invert drilling fluids.

WO-A-95/17244 describes a composition for the cleaning of oil-soiled surfaces, which contains surfactants that have HLB values of at least 8, in combination with an oil. As preferred surfactants, one can mention ethoxylated sorbitan fatty acid esters. Agents based on ethoxylated sorbitan fatty acid esters do have a good cleaning effect, but with regard to biodegradability and toxicity, such agents cannot yet fulfill all requirements that increasingly stringent environmental legislation requires.

In WO-A-98/19043, specific soybean polyol alkoxylates are disclosed as highly effective cleaning agents for drillholes or drill pipes, whereas WO-A-2006/007977 teaches the use of lithium salts of fatty alcohol sulfates for the cleaning of drillholes, drill pipes, or cuttings.

WO-A-01/42387 describes cleaning agents based on microemulsions, which comprise, among other things, nonionic surfactants as additives. The disadvantage of the cleaning agent described in this publication is to be found, however, in among other things, an unsatisfactory cleaning effect. The microemulsions described in this publication also exhibit a rather limited storage stability, which is manifested in, among other things, the fact that after a few days of storage, a separation of the microemulsion into two phases can already be observed.

The goal of the invention under consideration, therefore, was to overcome the disadvantages that arise from the state of the art, in connection with cleaning agents for oil field application.

In particular, the goal of the invention under consideration was to specify an emulsion as an additive for a fluid composition for the cleaning of drillholes, drill pipes, or cuttings, which improves the cleaning effect, in comparison with traditional fluid compositions.

Furthermore, the emulsion that can be used as an additive for a fluid composition, in comparison with the emulsions known from the state of the art, should be characterized by an improved storage stability.

A contribution to the achievement of the initially mentioned goal is an emulsion consisting of an oil phase and an aqueous phase and comprising, as emulsion components, the following:

($\alpha$1) 15 to 40 wt %, with particular preference, 17.5 to 35 wt % and most preferred, 20 to 30 wt % of at least one organic solvent, which is not miscible with water, as a solvent of the oil phase;

($\alpha$2) 15 to 40 wt %, with particular preference, 20 to 37.5 wt % and most preferred, 25 to 35 wt % water as the solvent of the aqueous phase;

(α3) 10 to 40 wt %, with particular preference, 15 to 37.5 wt %, and most preferred, 20 to 30 wt % of at least one surfactant;

(α4) 10 to 40 wt %, with particular preference, 17.5 to 35 wt %, and most preferred, 20 to 30 wt % of an alkoxylated fatty alcohol; and (α5) 0 to 25 wt %, with particular preference, 0.01 to 10 wt %, and most preferred, 0.1 to 1 wt % of at least one other additive;

wherein the weight quantities of components (α1) to (α5) each refer to the total weight of the emulsion and together yield 100 wt %.

Completely surprising, but not less advantageous, it was determined that the cleaning effect of traditional fluid compositions, used as cleaning agents, to which the previously described microemulsions are added as an additive—compared with a fluid composition to which a traditional emulsion, to which no alkoxylated fatty alcohol is added as an additive—can increase significantly. Also, the storage stability of the emulsion is discernibly improved by the addition of the alkoxylated fatty alcohol as another emulsion component, in a quantity in a range of 10 to 40 wt %.

The emulsion in accordance with the invention consists of an oil phase and an aqueous phase and, as emulsion components, comprises at least one organic solvent, which is not miscible with water, as a solvent of the oil phase; water, as a solvent for the aqueous phase; at least one surfactant; an alkoxylated fatty alcohol; and optionally at least one additional additive.

The emulsion can be a water-in-oil emulsion or an oil-in-water emulsion, wherein the type of emulsion, with a given organic solvent and a given ratio of organic solvent to water, is, in particular, dependent on the type and quantity of used surfactant. Furthermore, the emulsion can be present as a nanoemulsion or as a microemulsion, in which 90 volume-% of the drops of the aqueous phase or the drops of the oil phase have a drop size of less than 500 μm, preferably, less than 400 μm, and most preferred, less than 300 μm; 50 volume-% of the drops of the aqueous phase or the drops of the oil phase have a drop size of less than 400 μm, preferably, less than 300 μm, and most preferred, less than 200 μm; and 10 volume-% of the drops of the aqueous phase or the drops of the oil phase have a drop size of less than 300 μm, preferably less than 200 μm, and most preferred, less than 150 μm. Particularly preferred, the emulsion has a drop size of the discontinuous phase of less than 0.3 μm.

The terms used in the preceding, "microemulsion" and "nanoemulsion," characterize emulsions in accordance with the invention, which comprise drops in the micrometer or nanometer range, wherein there may be a certain overlapping of these two ranges and thus also of these two terms. In accordance with part of the reference literature and also the state of the art, concerning drilling fluids, microemulsions preferably mean those emulsions that are spontaneously formed with a combination of the emulsion components, whereas the formation of nanoemulsions usually requires the supply of energy, for example, in the form of a homogenization, in particular, in the form of a high-pressure homogenization.

As an organic solvent (α1) that is not miscible with water, all solvents known to the specialist that have a cleaning effect can be taken into consideration. As examples one can mention paraffins, internal olefins, linear olefins, aromatic hydrocarbons, mineral oils, carboxylic acid esters, in particular, fatty acid esters, with very particular preference, triglycerides and triacetin, alcohols and carbonates.

Preferred paraffins are thereby, in particular, paraffins with 5 to 22 C atoms. Paraffins—more concretely designated as alkanes—are, as is known, saturated hydrocarbons, which, for the linear or branched representatives, follow the general molecular formula $C_nH_{2n+1}$. The cyclic alkanes follow the general molecular formula $C_nH_{2n}$. Linear and branched paraffins are particularly preferred, whereas cyclic paraffins are less preferred. The use of branched paraffins is particularly preferred. Furthermore, those paraffins are preferred, which are liquid at room temperature—that is, those with 5 to 16 C atoms per molecule. However, it may also be preferable to use paraffins with 17 to 22

C atoms, which have a waxlike consistency. However, it is preferable to use mixtures of the various paraffins, wherein it is particularly preferred if these mixtures are still liquid at 21° C. Such mixtures can be formed, for example, from paraffins with 10 to 21 C atoms. Paraffins are particularly preferred oil phases—alone or as a mixture component with other oil phases—in drilling fluids.

As internal olefins (below, abbreviated as IO), it is possible to use all internal olefins known to the specialist and, in particular, suitable for use as drilling fluids or drillhole cleaning agents. These IOs can be produced by all methods for the purpose known to the specialist. EP 0 787 706 A1 describes, for example, a method for the synthesis of IOs by the isomerization of alpha-olefins on sulfonic or persulfonic acids. It is characteristic that the IOs thus obtained are linear and contain at least an olefinic double bond, which is not found in the alpha-position of the alkyl chain. Preferably, in accordance with the invention, those IOs or IO mixtures with 12 to 30 C atoms in the molecule, preferably, with 14 to 24 C atoms, and in particular, with up to 20 C atoms in the molecule are used.

As linear alpha-olefins (for short, LAO), unsaturated hydrocarbons, which are unbranched in the 1-position ("alpha-C-atom"), are preferably used. They can be based on natural substances, but can also be produced, in particular, synthetically on a large scale. Natural substance-based LAO are produced by dehydration of natural substance-based fatty alcohols as linear products with a straight-chain carbon number. Also, the LAO produced synthetically—created by the oligomerization of ethylene—frequently contain straight-chain hydrocarbon numbers in the chain, but, nowadays, however, methods for the production of odd-number alpha olefins are known. In the sense of the definition, in accordance with the invention, [they] have, as a rule and as a result of their volatility, at least 10, preferably, at least 12 to 14 C atoms in the molecule. The upper limit of the LAO that are flowable at room temperature is in the range of $C_{18}$ to $C_{20}$.

This upper limit is, however, not limiting for the usability of this class of substances within the framework of the invention. The upper limit of suitable LAO compounds for use within the framework of the teaching in accordance with the invention is therefore clearly above the previously mentioned limiting value of $C_{18}$ to $C_{20}$ and can, for example, reach $C_{30}$.

As aromatic hydrocarbons, in particular, compounds can be chosen from the group consisting of toluene, benzene, xylene and mesitylene.

Mineral oils preferred in accordance with the invention are, in particular, the liquid distillation products obtained from mineral raw materials (petroleum, lignite and bituminous coal, wood, or peat), which essentially consist of mixtures of saturated hydrocarbons. Preferably, the minerals contain only small quantities of aromatic hydrocarbons, preferably, less than 3 wt %. Mineral oils, which are liquid at 21° C., are preferably based on petroleum. The mineral oils preferably have boiling points of 180 to 300° C.

Carboxylic acid esters, which are preferred in accordance with the invention, are, in particular, those esters that are obtained by the reaction of fatty acids or hydroxyl fatty acids with mono-, di-, or triols, with particular preference, with methanol, ethanol, glycerol, or a mixture that also comprises diglycerol or triglycerol, in addition to glycerol. Particularly preferred, in accordance with the invention, is the use of esters that were obtained by the reaction of mono-, di-, or triols with fatty acids selected from the group consisting of caproic acid, enanthic acid, caprylic acid, pelargonic acid, capric acid, lauric acid, myristic acid, fish oil, palmitic acid, pelagonic acid, margaric acid, stearic acid, isostearic acid, arachinic acid, behenic acid, lignoceric acid, cerotinic acid, undecylenic acid, oleic acid, elaidinic acid, vaccenic acid, icocenic acid, rapeseed oil, cetoleic acid, erucic acid, nervonic acid, linoleic acid, linolenic acid, arachidonic acid, timnodonic acid, clupanodonic acid, and cervonic acid, or with hydroxy fatty acids selected from the group consisting of ricinoleic acid, 12-hydroxystearic acid, hydrogenated castor oil fatty acids (fatty acids that contain small quantities of stearic acid and palmitic acid, as well as 12-hydroxystearic acid), sabinic acid, 2-hydroxytetradecanoic acid, ipurolinic acid (3,11-dihydroxytetradecanoic acid, 2-hydroxyhexadecanoic acid, jalapinolic acid, juniperic acid, ambrettolic acid, aleuritic acid, 2-hydroxyoctadecanoic acid, 18-hydroxyoctadecanoic acid, 9,10-dihydroxyoctadecanoic acid, kamiolenic acid, ferronic acid, cerebronic acid, 9-hydroxystearic acid, and 10-hydroxystearic acid, wherein, in particular, the methyl and ethyl esters of the previously mentioned fatty acids and hydroxy fatty acids are particularly preferred. Other suitable carboxylic acid esters are, for example, esters of 2-hexyl-$C_2$-$C_{18}$-carboxylic acids.

In particular, alcohols selected from the group consisting of $C_6$- to $C_{30}$-alkanols, with particular preference, $C_7$- to $C_{20}$-alkanols, and most preferably, $C_8$- to $C_{15}$-alkanols, such as hexanol, 2-ethylhexanol, heptanol, octanol, and nonanol can be contained as alcohols in the emulsion (O). The use of fatty alcohols is particularly advantageous, wherein, as fatty alcohol, those fatty alcohols that can be obtained by the reduction of the previously mentioned fatty acids are preferably used. Preferred carbonates are carbonic acid esters of fatty alcohols with 8 to 22 C-atoms, preferably, the diesters of the carbonic acid. Those compounds and their use as the oil phase for drilling fluids are described in DE 40 18 228 A1.

In addition to the previously mentioned organic solvents, one can mention as additional suitable solvents, in particular, those solvents that are mentioned in WO-A-01/42387.

The previously mentioned organic solvents can be used alone or in mixtures of two or more organic solvents, so as to form the organic solvent ($\alpha$1) of the oil phase.

The water ($\alpha$2) for the aqueous phase of the emulsion in accordance with the invention can be fresh, tap, river, sea water, produced water or formation water. The aqueous phase can have a total content of 0 to 250 g/L, for example, 5 to 50 g/L and a pH value of 0.5 to 9. If the aqueous phase comprises a sea water solution of a strongly acidic extraction chemical, such as a scale inhibitor, it may be possible for this aqueous phase to have a strongly acidic pH of 0.1 to 1. In such cases, it may be necessary to neutralize the acidity of the aqueous phase by using ammonium hydroxide or an alkali metal hydroxide, in particular, sodium hydroxide, potassium hydroxide, or lithium hydroxide, so as to adjust the pH of the formulation within a preferred range of 2 to 6. Advantageously, the aqueous phase is neutralized before it is mixed with the organic phase and the surfactant, so as to form the microemulsion.

As a surfactant ($\alpha$3), one can use all surfactants known to the specialist, which can be used for the production of emulsions for oil field application, in particular, for the production of microemulsions, and which act as an emulsifier in these compositions. However, advantageously, surfactants ($\alpha$3) are selected in which we are not dealing with an alkoxylated fatty alcohol, preferably, not an alkoxylated fatty alcohol as is described in connection with component ($\alpha$4).

As surfactants, it is possible to use anionic, nonionic, zwitterionic, or cationic surfactants. However, nonionic and the anionic surfactants are preferred. Typical examples for anionic surfactants are soaps, alkylbenzenesulfonates, alkane sulfonates, olefin sulfonates, alkyl ether sulfonates, glycerol ether sulfonates, methyl ester sulfonates, sulfo fatty acids, alkyl sulfates, fatty alcohol ether sulfates, glycerol ether sulfates, fatty acid ether sulfates, hydroxy mixed ether sulfates, monoglyceride (ether) sulfates, fatty acid amide (ether) sulfates, monoalkyl and dialkyl sulfosuccinates, monoalkyl and dialkyl sulfosuccimates, sulfotriglycerides, amide soaps, ether carboxylic acids and their salts. Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers or mixed formals, optionally partially oxidized alk(en)yl oligoglycosides or glucoronic acid derivatives, fatty acid-N-alkyl glucamides, polyol fatty acid esters, sugar esters, sorbitan esters, polysorbates, and aminoxides. If the nonionic surfactants contain polyglycol ether chains, they can have conventional, advantageously, however, a narrow homolog distribution.

In accordance with the invention, particularly preferred surfactants ($\alpha$3) acting as emulsifiers are, in particular, assigned to the following classes of substances: (oligo)alkoxylates—in particular, low alkoxylates, wherein here, the corresponding ethoxylates and/or propoxylates have particular importance—of basic molecules of natural and/or synthetic origin, which contain lipophilic radicals and are capable of alkoxylation. Alkoxylates of the indicated type are, as is known, as such—that is, with a terminal free hydroxyl group on the alkoxylate radical—nonionic emulsifiers; the corresponding compounds, however, can also be end group-closed, for example by esterification and/or etherification. Another important class of nonionic emulsifiers for the purpose of the invention are [sic] partial esters and/or partial ethers of multifunctional alcohols with, in particular, 2 to 6 C atoms and 2 to 6 OH groups and/or their oligomers with acids and/or alcohols containing lipophilic radials. Compounds of this type, which also contain (oligo)alkoxy radicals and in particular, thereby, corresponding oligoethoxy radicals, bound into their molecular structure are also particularly suitable thereby. The polyfunctional alcohols with 2 to 6 OH groups in the basic molecule or the oligomers derived therefrom can be, in particular, diols and/or triols or their oligomerization products, wherein special importance can be attributed to glycol and glycerol or their oligomers. Also, known nonionic emulsifiers of the type of the ethylene oxide/propylene oxide/butylene oxide block copolymers are assigned to the area of partial ethers of multifunctional alcohols. Another example for corresponding emulsifier components are alkyl(poly)glycosides of long-chain alcohols, mostly with 8 and more C-atoms, and the already mentioned fatty alcohols of natural and/or synthetic origin or alkylol amides, amine oxides, and lecithins. The joint use of currently commercial alkyl(poly)glycoside compounds (APG compounds) as emulsifier components in the sense in accordance with the invention can be of particular interest because, among other things, this is an emulsifier class of particularly pronounced ecological compatibility. Without any claim of completeness, the following representatives are also mentioned from the classes of substances of suitable emulsifier components listed here: (oligo)alkoxylates of fatty alcohols, fatty acids, fatty amines, fatty amides, fatty acid and/or fatty alcohol esters and/or ethers, alkanol amides, alkyl phenols and/or their reaction products with formaldehyde and other reaction products of carrier molecules containing lipophilic radicals with lower alkoxides. As indicated, the individual reaction products can also be, at least in part, end group-closed. Examples of partial esters and/or partial ethers of multifunctional alcohols are, in particular, the corresponding partial esters with fatty acids, for example, of the type of glycerol monoesters and/or diesters, glycol monoesters, corresponding partial esters of oligomerized multifunctional alcohols, sorbitan partial esters and the like, and corresponding compounds with ether groups.

In accordance with the invention, the use of alkyl polyglycosides, mono-, di-, or triesters from glycerol and fatty acids or mixtures of at least two of these compounds as surfactants ($\alpha 3$) is particularly preferred, wherein, in this connection, a mixture of an alkyl polyglycoside and a monoester of glycerol and a fatty acid, in particular, glycerol and oleic acid, is mostly preferred.

The emulsion in accordance with the invention comprises, in addition to the previously described emulsion components ($\alpha 1$) to ($\alpha 3$), an alkoxylated fatty alcohol ($\alpha 4$).

Alkoxylated fatty alcohols, which are suitable in accordance with the invention, are fatty alcohols that were ethoxylated with 2 to 10 ethylene oxide units, with particular preference, 2 to 8 ethylene oxide units, even more preferred, 2 to 6 ethylene oxide units, and most preferred, 4 ethylene oxide units. In accordance with a special embodiment of the emulsion in accordance with the invention, the alkoxylated fatty alcohol used as an emulsifier component ($\alpha 4$), however, can also have only one alkylene oxide unit, advantageously, one ethylene oxide and/or one propylene oxide unit.

As fatty alcohols, one can, in particular, take into consideration $C_6$- to $C_{18}$-fatty alcohols, even more preferred, $C_8$- or $C_{12}$- to $C_{14}$-fatty alcohols. Suitable fatty alcohols are, for example, selected from the group consisting of capronic acohol, caprylic alcohol, capric alcohol, 2-ethylhexyl alcohol, lauryl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, and erucyl alcohol.

Particularly preferred ethoxylated fatty alcohols ($\alpha 4$) in accordance with the invention are $C_8$-fatty alcohols, ethoxylated, in particular, with 4 ethylene oxide units, as they are obtained, for example, under the trademark Dehydrol® 04 from the Cognis Company. Particularly suitable alkoxylated fatty alcohols ($\alpha 4$) in accordance with the invention are also those that are based on a $C_8$- to $C_{14}$-fatty alcohol alkoxylated with 6 ethylene oxide units or on a $C_{12}$- to $C_{14}$-fatty alcohol alkoxylated with 5 ethylene oxide units and 4 propylene oxide units. Decyl alcohol alkoxylated, for example, with 6 ethylene oxide units, can also be used.

The emulsion in accordance with the invention also optionally comprises at least one other additive ($\alpha 5$).

As an additive, basically all additives that are usually contained in cleaning compositions for oil field application can thereby be used. Among these additives are, in particular, weighing agents, fluid-loss additives, viscosity-regulating additives, wetting agents, salts, biocides, corrosion inhibitors, and/or an alkali reserve can be taken into consideration. General principles for the composition of the individual treatment liquids are valid here.

Classic additives can be the following: fluid-loss additives, structural viscosity-building soluble and/or insoluble substances, alkali reserves, agents for the inhibition of the undesired water exchange between drilled formations—for example, water-swelling clays and/or salt layers—and the aqueous solution, biocides, for example, to inhibit the bacterial attack of the aqueous composition, and the like. In particular, bentonite and hydrophobicized bentonite can be taken into consideration as agents for the buildup of the structural viscosity, which, at the same time, also act as fluid-loss additives.

Also, the joint use of organic polymer compounds of natural and/or synthetic origin can also prove to be advantageous. One can also mention here, in particular, starch or chemically modified starches, cellulose derivatives, such as carboxy methyl cellulose, guar gum, synthan gum, or also purely synthetic, water-soluble and/or water-dispersible polymer compounds, in particular of the type of high-molecular polyacrylamide compounds with or without anionic or cationic modification.

Other usable additives are diluting agents for viscosity regulation, wherein these diluting agents can be of an organic or inorganic nature and, for example, among others, comprise tannins and/or quebracho extract, lignite and lignite derivatives, in particular, lignosulfonates.

Other usable additives are also organic carboxylic acids, such as citric acid, lactic acid, malic acid, butyric acid, maleic acid, fumaric acid, propionic acid, or malonic acid, wherein the use of citric acid and lactic acid is particularly preferred and the use of citric acid is the most preferred.

Also, solvents miscible with water, such as methanol, ethanol, n-propanol, isopropanol, n-butanol, isobutanol, tert-butanol, butyl monoglycol ether, butyl diglycol ether, butyl triglycol ether, ethylene glycol monobutyl ether, and ethylene glycol can be used as additives. Without being bound to a theory, it is assumed that the presence of a water-miscible solvent in the aqueous phase stabilizes the microemulsion in such a way that less surfactant is required, so as to form a stable microemulsion. The quantity of water-miscible solvent that can be present in the aqueous phase is in the range of 0.5 to 50 wt %, preferably, 5 to 30 wt %, based on the total weight of water and water-miscible solvent.

A method for the production of an emulsion comprising the following method steps also makes a contribution to the attainment of the goals mentioned in the beginning:

(I) preparation of the emulsion components ($\alpha 1$) to ($\alpha 4$) and optionally ($\alpha 5$), as described in the preceding;

(II) mixing of the emulsion components under conditions under which a clear emulsion is formed from the emulsion components.

It is thereby preferred in accordance with the invention for the individual emulsion components (organic solvent of the oil phase, water, surfactant, alkoxylated fatty alcohol, and optionally other additives) to be brought into contact with one another in such quantities that an emulsion comprising the following:

($\alpha 1$) 15 to 40 wt %, with particular preference, 17.5 to 35 wt %, and most preferred, 20 to 30 wt % of the organic solvent;

($\alpha 2$) 15 to 40 wt %, with particular preference, 20 to 37.5 wt %, and most preferred, 25 to 35 wt % water;

($\alpha 3$) 10 to 40 wt %, with particular preference, 15 to 37.5 wt %, and most preferred, 20 to 30 wt % of the surfactant;

($\alpha 4$) 10 to 40 wt %, with particular preference, 17.5 to 35 wt %, and most preferred, 20 to 30 wt % of the alkoxylated fatty alcohol; and (α5) 0 to 25 wt %, with particular preference, 0.01 to 10 wt %, and most preferred, 0.1 to 1 wt % of the at least one other additive;
wherein the weight quantities of the components (α1) to (α4) each refer to the total weight of the emulsion and produce 100 wt %, is obtained.

Advantageously for the production of the emulsion, all components (α1) to (α4) are present in liquid form. If individual components are to be present, at least partially, in solid form under the temperature conditions, it is advantageous for these components to be heated first to the melting point or above and to melt in this way and then to be used in the molten state for the production of the emulsion.

The bringing into contact of the emulsion components in method step 11) is advantageously carried out by the mixing method, known to the specialist for the production of emulsions, advantageously, of microemulsions, with the characteristics described in connection with the emulsion in accordance with the invention. The production of such microemulsions by high-pressure homogenization or by ultrasound is, for example, conceivable.

It is thereby particularly preferred in accordance with the invention for the emulsion components (α1) to (α3) and optionally (α5) to first be brought into contact with one another, with the formation of an emulsion, and only then to mix the emulsion thus obtained with component (α4), wherein following this mixing, a high-pressure homogenization or an ultrasound treatment can be carried out, once again, so as to form a microemulsion.

An emulsion that can be obtained by the previously described method also makes a contribution to the attainment of the goals mentioned in the beginning.

The use of the previously described emulsion in accordance with the invention or the emulsion that can be obtained by the previously described method, as an additive in a fluid composition for the cleaning of drillholes, in particular, the walls of drillholes, of delivery or feeding pipes or of walls of the casing, and for the cleaning of drill pipes or of cuttings, also makes a contribution to the attainment of the goals mentioned in the beginning In this connection, it is particularly preferred for the emulsion in accordance with the invention or the emulsion that can be obtained by the method in accordance with the invention to be used in a quantity in a range of 1 to 20 wt %, with particular preference in a quantity in a range of 2.5 to 15 wt %, and most preferred, in a range of 5 to 10 wt %, respectively referred to the total weight of the fluid composition.

Furthermore, it is preferable in accordance with the invention for the fluid composition to be an aqueous fluid composition, which is based on water, advantageously at at least 50 wt %, even more preferably, at least 75 wt %, and most preferred, at least 90 wt %, respectively referred to the total weight of the fluid composition. Such aqueous fluid compositions can, for example, be obtained in that the emulsion in accordance with the invention or the emulsion that can be obtained with the method in accordance with the invention is mixed with water, for example, with tap water or sea water.

Among drilling devices, one can find, for example, pipe conduits and pipelines, but also tools that are used in drilling processes and that come into contact with other drilling liquids and/or petroleum. To clean the drilling devices, the fluid composition containing the emulsion in accordance with the invention or that can be obtained by the method in accordance with the invention is sprayed or applied on the surfaces of the objects, or the objects to be cleaned are immersed in the fluid composition that contains the emulsion in accordance with the invention or that can be obtained by the method in accordance with the invention. The soilings are thereby dissolved from the surfaces. Subsequently, the surfaces are brought into contact with water in such a way that the agents together with the soilings are removed, for example, in that the surface is sprayed with a water jet.

Furthermore, the fluid composition containing the emulsion in accordance with the invention or that can be obtained by the method in accordance with the invention is used to clean the so-called "cuttings." These are yielded during the drilling and must be deposited during off-shore drillings on the bottom of the sea in the surroundings of the drilling platform, which can lead to a serious introduction of oil into the environment. In order to avoid imposing an extensive ecological stress on the sea, the cuttings are previously cleaned and freed from the drilling fluid. The fluid composition that contains the emulsion in accordance with the invention or that can be obtained by the method in accordance with the invention can be used for all the cleaning processes known to the specialist, which appear in the area of petroleum drilling, both with off-shore drillings and also in drilling on land. Among these are, in particular, the removal of paraffin deposits from drillhole walls. Usually, drillholes are cleaned by pumping the cleaning fluid under pressure through the drillhole and by removing the deposits from the walls of the drillhole with the cleaning fluid. Subsequently, the soilings are transported from the drillhole by the fluid.

A method for the cleaning of the surfaces of drillholes, drilling devices, or cuttings also makes a contribution to the attainment of the goals mentioned in the beginning, wherein the surfaces are first brought into contact with the fluid composition containing the emulsion in accordance with the invention or the emulsion that can be obtained with the method in accordance with the invention and the surfaces are optionally subsequently flushed with water.

In accordance with a preferred embodiment of the method in accordance with the invention for the cleaning of the surfaces of drillholes, it comprises the following method steps:
(β1) the drilling of a drillhole in the ground, wherein this drilling advantageously is carried out with a drill head driven via a drill pipe;
(β2) the introduction of a feeding pipe into the borehole; and
(β3) the introduction of cement into at least one section of the gap between the outside of the feeding pipe and the walls of the borehole;
wherein before carrying out method step (β3), the fluid composition, which contains the emulsion in accordance with the invention or the emulsion that can be obtained by the method in accordance with the invention, is conducted through the gap between the outside of the feeding pipe and the walls of the drillhole, advantageously circulated in this gap. This circulation can, for example be carried out in that the fluid composition [is] pumped through the feeding pipe, advantageously via the drill pipe downwards, discharged at the lower end of the feeding pipe, advantageously on the drill head or the drill bit, and then again raised upwards through the gap between the outside of the feeding pipe and the walls of the drillhole. If the fluid composition is continuously pumped downwards through the feeding pipe, both the walls of the drillhole and also the outside of the feeding pipe can be cleaned in this manner.

In accordance with a preferred embodiment of the method in accordance with the invention, for the cleaning of the surfaces of drilling device, comprising the method step of the drilling of a drillhole in the ground with a drill head, driven via a drill pipe, wherein the fluid composition containing the emulsion in accordance with the invention or the emulsion that can be obtained by the method in accordance with the invention is at least partially conducted through the drill head, advantageously, at least in part is circulated through it, wherein this conducting through or this circulation takes place, at least in part during the presence of the drill head in the drillhole. [sic]

As drilling devices whose surface can be cleaned with the fluid composition containing the emulsion in accordance with the invention or with the emulsion that can be obtained by the method in accordance with the invention, one can take into consideration, in particular, drilling devices, such as the derrick, the drill string, in particular, the drill pipe and the drill bit, cleaning units, unit for the disposal of solids, in particular, vibrating screens or centrifuges, pumps, motors, or gears, or, however, the drilling platform or parts thereof.

A method for the production of a drillhole comprising the following method steps also makes a contribution to the attainment of the goals mentioned in the beginning:
- (β1) the drilling of a drillhole in the ground, wherein this drilling is advantageously carried out with a drill head driven via a drill pipe;
- (β2) the introduction of a feeding pipe into the drillhole;
- (β3) the introduction of cement into at least one section of the gap between the outside of the feeding pipe and the walls of the drillhole;
- (β4) optionally the introduction of a delivery pipe into the feeding pipe;
- (β5) optionally the introduction of a sealing liquid into the gap between the outside of the delivery pipe and that of the inside of the feeding pipe;

wherein surfaces of the drillhole, the feeding pipe, and optionally the delivery pipe, drill pipe, or the drilling head are brought into contact with the fluid composition containing the emulsion in accordance with the invention or the emulsion that can be obtained by the method in accordance with the invention. In particular, this coming into contact can take place in accordance with the previously described, preferred embodiment of the method in accordance with the invention for the cleaning of the surfaces of drill holes. Accordingly, it is preferable for the fluid composition containing the emulsion in accordance with the invention or that can be obtained by the method in accordance with the invention to be conducted through the gap between the outside of the feeding pipe and the walls of the drill hole, advantageously, to be circulated through this gap, before the carrying out of method step (β3).

As a sealing liquid that is introduced in method step (β5) into the gap between the outside of the delivery pipe and that of the inside of the feeding pipe, all materials known to the specialist for this purpose can be used. As an example, one can mention here those sealing liquids that are described in U.S. Pat. No. 7,219,735.

A method for the production of oil or gas, which, in addition to the previously mentioned method steps (β1) to (β3), and optionally (β4) and (β5), comprises the following method steps also makes another contribution to the attainment of the goals mentioned in the beginning:
- (β6) the extraction of oil or gas through the drillhole; and
- (β7) the purifying or refining of the extracted oil or gas;

wherein, here, the surfaces of the drillhole, the feeding pipe, and optionally the delivery pipe, the drill pipe or the drill head, are brought into contact with the fluid composition containing the emulsion in accordance with the invention or the emulsion that can be obtained in accordance with the invention. Here, too, this bringing into contact can be carried out in accordance with the previously described, preferred embodiment of the method in accordance with the invention for the cleaning of the surfaces of drillholes or drilling devices.

The invention will now be explained in more detail with the aid of nonlimiting examples.

COMPARISON EXAMPLE 1

A traditional emulsion of the following composition is used:

TABLE 1

| Component | Quantity in [wt %] |
|---|---|
| Alkyl polyglycoside (MW < 600 g/mol) [1] | 27.1 |
| Glycerol monooleate [2] | 8.5 |
| Methyl ester [3] | 29.4 |
| Water | 34.7 |
| Citric acid | 0.25 |

[1] Terradril ® S 853 B (is a 62 wt %, aqueous solution)
[2] Synative ® ES GMO
[3] Pernil ® Me TiO5

For the production of the emulsion, a mixture of the water and the citric acid is produced. Subsequently, the alkyl polyglycoside, the glycerol monooleate, and the methyl ester are added while stirring at 21° C., and homogenized by means of a magnet stirrer. An emulsion was obtained.

The previously described emulsion is present as a milky emulsion.

EXAMPLE 1

20.8 wt % Dehydrol® 04 (with 4 ethylene oxide units of ethoxylated $C_8$-fatty alcohol from the Cognis Company) (relative to the total weight of the microemulsion then obtained) are added to the emulsion described in the comparison example while stirring. Subsequently, homogenization is once again carried out. A clear emulsion is obtained.

EXAMPLE 2

20.3 wt % with 6 ethylene oxide units of alkoxylated decyl alcohol (relative to the total weight of the microemulsion then obtained) are added (product Lutensol® XL 60 from the BASF Company, Ludwigshafen) to the emulsion while stirring. Subsequently, homogenization is once again carried out. A clear emulsion is obtained.

EXAMPLE 3

24.9 wt % with 5 ethylene oxide units and 4 propylene oxide units of alkoxylated $C_{12-14}$ fatty alcohol (relative to the total weight of the microemulsion then obtained) are added (product Dehypon® LS 54 from Cognis, Duesseldorf) to an emulsion, which is very similar to the emulsion described in the comparison example, while stirring. Subsequently, homogenization is once again carried out. A clear emulsion is obtained.

Determination of the Cleaning Effect and the Storage Stability

The cleaning effect and the storage stability are determined with the microemulsions obtained in the comparison example and in Examples 1 to 3.

For the determination of the cleaning effect, approximately 12 g of a test sludge are weighed in a weighed-out mixing beaker and spread homogenously up to somewhat below the 350-mL mark, with a brush. The weight remaining after the brush application is the effective weighed sample.

For the cleaning of the drilling fluid, 500 mL of a 5% washing solution are produced. With a measuring cylinder, 250 mL of the 5% cleaning solution are poured into the mixing beaker and stirred with a stirrer (propeller stirrer) for 3 minutes. The speed should be approximately 700 rpm. Swiveling is briefly carried out manually twice and the drilling fluid is shaken out with the cleaning solution. The mixing beaker is then placed on a filter paper with the opening downwards for 2 minutes, and subsequently weighed. The remaining weight is noted.

For the second washing, 250 mL fresh cleaning solution is again added along the rim of the beaker. The washing process is repeated for 3 minutes and the beaker is again placed on the filter paper. Finally, the weight of the mixing beaker is determined.

The cleaning effect R (indicated in %) is calculated as follows:

$$\frac{(B-T) \times 100}{E} - 100 = R$$

wherein
B is the gross weight after the first and second washings;
T is the tare weight of the mixing beaker; and
E is the weighed sample of the drilling fluid.

In addition to the cleaning effect, the storage stability is also determined after four hours of storage at 0° C. and with five days of storage at 4° C. and immediately after production. The results can be seen in the following table:

TABLE 3

|  | Comparison example | Example 1 | Example 2 | Example 3 |
|---|---|---|---|---|
| % Product in solution | 5 | 5 | 5 | 5 |
| Cleaning effect, 1st Washing | 48.2 | 74.1 | 62.4 | 64.3 |
| Cleaning effect, 2nd Washing | 56.4 | 88.1 | 78.8 | 79.4 |
| Appearance after production | White emulsion, inhomogeneous | Clear microemulsion | Not determined | Not determined |
| Appearance after 4 h, at 0° C. | 2 Phases, ¼ above (clear), below white | Clear microemulsion | Not determined | Not determined |
| Appearance after 5 days, at −4° C. | 2 Phases, ¼ above (clear), below white | Clear microemulsion | Not determined | Not determined |
| Appearance after 3.5 months of storage, at 22° C. |  | Clear, stable product | Clear, stable product | Clear, stable product |

What is claimed is:

1. An emulsion comprising an oil phase and an aqueous phase and containing as emulsion components the following:
(α1) 15 to 40 wt % of at least one organic solvent, which is not miscible with water, as a solvent of the oil phase;
(α2) 15 to 40 wt % water, as a solvent of the aqueous phase;
(α3) 10 to 40 wt % of at least one surfactant;
(α4) 10 to 40 wt % of an alkoxylated fatty alcohol; and
(α5) 0 to 25 wt % of at least one other additive;
wherein the weight quantities of components (α1) to (α5) are individually referred to the total weight of the emulsion and together produce 100 wt %.

2. The emulsion according to claim 1, wherein the organic solvent (α1), which is not miscible with water, is an ester from a fatty acid and an alcohol.

3. The emulsion according to claim 2, wherein the organic solvent (α1), which is not miscible with water, is an ester from a fatty acid and methanol.

4. The emulsion according to claim 1, wherein the at least one surfactant (α3) is a nonionic surfactant.

5. The emulsion according to claim 1, wherein the at least one surfactant (α3) is selected from the group consisting of alkyl polyglycosides, mono-, di-, or triesters from glycerol and fatty acids and mixtures of at least two of these compounds.

6. The emulsion according to claim 5, wherein the surfactant (α3) is a mixture of an alkyl polyglycoside and a monoester from glycerol and a fatty acid.

7. The emulsion according to claim 1, wherein the emulsion is a microemulsion with a drop size of the discontinuous phase of less than 0.3 μm.

8. The emulsion according to claim 1, wherein the emulsion is a water-in-oil emulsion.

9. The emulsion according to claim 1, wherein the emulsion is an oil-in-water emulsion.

10. The emulsion according to claim 1, wherein the alkoxylated fatty alcohol (α4) is a fatty alcohol with an alkylene oxide unit.

11. The emulsion according to claim 10, wherein the alkoxylated fatty alcohol is a fatty alcohol, ethoxylated with 2 to 8 mol ethylene oxide per mol fatty alcohol.

12. The emulsion according to one of claim 10, wherein the alkoxylated fatty alcohol (α4) is based on a $C_8$- to $C_{14}$-fatty alcohol, alkoxylated with 6 ethylene oxide units.

13. The emulsion according to claim 10, wherein the alkoxylated fatty alcohol (α4) is based on a $C_{12}$- to $C_{14}$-fatty alcohol, alkoxylated with 5 ethylene oxide units and 4 propylene oxide units.

14. The emulsion according to claim 1, wherein the alkoxylated fatty alcohol (α4) is based on a $C_6$- to $C_{18}$-fatty alcohol.

15. A method for the production of a drillhole, comprising the following method steps:
(β1) the drilling of a drillhole in the ground;
(β2) the introduction of a feeding pipe into the drillhole;
(β3) the introduction of cement in at least one section of the gap between the outside of the feeding pipe and the walls of the drillhole;
(β4) optionally the introduction of a delivery pipe in the feeding pipe;
(β5) optionally the introduction of a sealing liquid into the gap between the outside of the delivery pipe and the inside of the feeding pipe;

wherein surfaces of the drillhole, the feeding pipe, or the delivery pipe are brought into contact with a fluid composition containing the emulsion according claim 1.

16. A method for the production of oil or gas, comprising the following method steps:
(β1) the drilling of a drillhole in the ground;
(β2) the introduction of a feeding pipe in the drillhole;
(β3) the introduction of cement in at least one sector of the gap between the outside of the feeding pipe and the walls of the drillhole;
(β4) optionally the introduction of a delivery pipe into the feeding pipe;
(β5) optionally the introduction of a sealing liquid into the gap between the outside of the delivery pipe and the inside of the feeding pipe;
(β6) the extraction of oil or gas through the drillhole; and
(β7) the purification or refining of the extracted oil or gas;
wherein surfaces of the drillhole, the feeding pipe, or the delivery pipe are brought into contact with the fluid composition containing the emulsion according to claim 1.

17. A method for the production of an emulsion, containing the following method steps:
(I) preparation of the emulsion components (α1) to (α4) and optionally (α5), as defined in claim 1;
(II) mixing of the emulsion components under conditions under which a clear emulsion is formed from the emulsion components.

18. An emulsion obtained by the method according to claim 17.

19. A method for the cleaning of the surfaces of drillholes, drilling devices, or cuttings, wherein the surfaces are first brought into contact with a fluid composition containing an emulsion and the surfaces are optionally subsequently flushed with water, said emulsion comprising an oil phase and an aqueous phase and containing as emulsion components the following:
(α1) 15 to 40 wt % of at least one organic solvent, which is not miscible with water, as a solvent of the oil phase;
(α2) 15 to 40 wt % water, as a solvent of the aqueous phase;
(α3) 10 to 40 wt % of at least one surfactant;
(α4) 10 to 40 wt % of an alkoxylated fatty alcohol; and
(α5) 0 to 25 wt % of at least one other additive;
wherein the weight quantities of components (α1) to (α5) are individually referred to the total weight of the emulsion and together produce 100 wt %.

20. Method according to claim 19, containing the following method steps:
(β1) the drilling of a drillhole in the ground;
(β2) the introduction of a feeding pipe into the drillhole; and
(β3) the introduction of cement into at least one section of the gap between the outside of the feeding pipe and the walls of the drillhole;
wherein before the carrying out of method step (β1), the fluid composition containing the emulsion is conducted through the gap between the outside of the feeding pipe and the walls of the drillhole.

21. Method according to claim 19, comprising the following method step:
(β1) the drilling of a drillhole in the ground by means of a drilling head driven via a drill pipe;
wherein the fluid composition containing the emulsion is conducted through at least the drilling head, wherein this conducting through, at least in part, takes place during the presence of the drilling head in the drillhole.

* * * * *

UNITED STATES PATENT AND TRADEMARK OFFICE
CERTIFICATE OF CORRECTION

PATENT NO.        : 8,763,724 B2                                               Page 1 of 1
APPLICATION NO.   : 13/259944
DATED             : July 1, 2014
INVENTOR(S)       : Heinz Muller et al.

It is certified that error appears in the above-identified patent and that said Letters Patent is hereby corrected as shown below:

Title page (56) Other Publications, "and Written Opinionin" should read --and Written Opinion in--.

Specification

Col. 4, line 12, "paraffins with 17 to 22" should read --paraffins with 17 to 22 C atoms per molecule.--.

Col. 5, line 24, "hydroxytetradecanoic acid," should read --hydroxytetradecanoic acid),--.

Col. 6, line 44, "invention are [sic] partial" should read --invention is partial--.

Col. 11, line 6, "the drillhole. [sic]" should read --the drillhole.--.

Claims

Col. 14, line 27, Claim 12, "according to one of claim 10" should read --according to claim 10--.

Col. 14, line 29, Claim 13, "according to one of claim 10" should read --according to claim 10--.

Col. 15, line 3, Claim 16, "according claim 1" should read --according to claim 1--.

Col. 16, line 21, Claim 20, "(β1)" should read --(β3)--.

Signed and Sealed this
Sixth Day of October, 2015

Michelle K. Lee
*Director of the United States Patent and Trademark Office*